United States Patent
Goode (10) Patent No.: US 6,718,552 B1
(45) Date of Patent: Apr. 6, 2004

(54) NETWORK BANDWIDTH OPTIMIZATION BY DYNAMIC CHANNEL ALLOCATION

(75) Inventor: Christopher Goode, Menlo Park, CA (US)

(73) Assignee: DIVA Systems Corporation, Redwood City, CA (US)

(*) Notice: Subject to any disclaimer, the term of this patent is extended or adjusted under 35 U.S.C. 154(b) by 0 days.

(21) Appl. No.: 09/295,738

(22) Filed: Apr. 20, 1999

(51) Int. Cl.[7] .............................................. H04N 7/173
(52) U.S. Cl. ........................... 725/95; 725/116; 725/126
(58) Field of Search .............................. 725/95, 96, 97, 725/126, 119, 120, 114, 86, 116; 709/219; 370/431, 433, 437

(56) References Cited

U.S. PATENT DOCUMENTS

| | | | | |
|---|---|---|---|---|
| 5,469,431 A | * | 11/1995 | Wendorf et al. ............. 370/254 |
| 5,541,757 A | | 7/1996 | Fuse et al. .................. 359/125 |
| 5,592,470 A | * | 1/1997 | Rudrapatna et al. ........ 370/320 |
| 5,675,732 A | * | 10/1997 | Majeti et al. ................ 709/235 |
| 5,696,765 A | * | 12/1997 | Safadi ......................... 725/95 |
| 5,734,589 A | | 3/1998 | Kostreski et al. ....... 364/514 A |
| 5,822,530 A | * | 10/1998 | Brown ......................... 725/96 |
| 5,886,995 A | * | 3/1999 | Arsenault et al. ............. 725/95 |
| 5,920,700 A | * | 7/1999 | Gordon et al. ................ 725/97 |
| 5,940,738 A | * | 8/1999 | Rao ............................. 725/97 |
| 6,253,375 B1 | * | 6/2001 | Gordon et al. ................ 725/95 |
| 6,452,935 B1 | * | 9/2002 | Gibbs ......................... 370/439 |
| 6,591,422 B1 | * | 7/2003 | Cesar et al. .................. 725/95 |

FOREIGN PATENT DOCUMENTS

| | | | | |
|---|---|---|---|---|
| WO | WO 95/12284 | 5/1995 | .......... H04N/7/167 |
| WO | WO 96/37983 | 11/1996 | ............ H04L/5/16 |
| WO | WO 97/01244 | 1/1997 | ............ H04N/7/10 |
| WO | WO 98/31114 | 7/1998 | ............ H04H/9/00 |

* cited by examiner

Primary Examiner—John Miller
Assistant Examiner—Scott Beliveau
(74) Attorney, Agent, or Firm—Moser, Patterson & Sheridan LLP (57) ABSTRACT

An information delivery system provides programming, such as video programming, by dynamically allocating the programming to channel slots, based on the availability of the channel slots. Programming with high viewership statistics is transmitted substantially continuously and programming with lower viewership statistics is transmitted "on-demand" in response to requests by users by way of a subscriber station. The subscriber stations maintain a map, provided by a corresponding session control manager, of currently available and currently transmitted channels. The information delivery system, in a preferred embodiment, takes the form of a Hybrid Fiber Coaxial (HFC) system.

11 Claims, 9 Drawing Sheets

| CHANNEL | FREQUENCY | PROGRAM | AVAILABLE | OTHER CHANNEL DATA |
|---|---|---|---|---|
| 1 | 55 MHz | 1 | Y | ANALOG/DIGITAL, ETC. |
| 2 | 55 MHz | 2 | Y | |
| | | | | |
| Y | | | | |

NETWORK BANDWIDTH OPTIMIZATION BY DYNAMIC CHANNEL ALLOCATION

CROSS-REFERENCES TO RELATED APPLICATIONS

This invention relates generally to U.S. Pat. No. 6,253,375, issued Jun. 26, 2001, and entitled "System for Interactively Distributing Information Services" the disclosure of which is incorporated herein by reference.

BACKGROUND OF THE INVENTION

1. Field of the Invention

This invention relates generally to the field of network bandwidth utilization and more particularly to optimization of network bandwidth utilization in a Hybrid Fiber Coaxial (HFC) network system capable of uni-cast, multi-cast and/or broadcast of information.

2. Description of the Background Art

Traditional broadcast systems, such as cable systems, require increasingly greater bandwidth to support the increased availability of programming, such as new cable channels, to subscribers. Other factors contributing to the need for increased bandwidth are the advent of high definition television (HDTV) and the enactment of digital must-carry rules. Traditionally, cable systems allocate fixed bandwidth to linear program material independently of whether customers are viewing the material at any time. In modern cable systems that may provide several hundred program choices at any given time, the chances that transmitted programming is not being viewed rises dramatically.

A number of techniques are available to increase available channel bandwidth. For example, digital transmission technology allows a number of channels, such as 6 to 8 digital channels, to be transmitted in the space of one analog channel. Statistical multiplexing can also be used to effect further bandwidth increases. While such techniques are useful in increasing the available channel bandwidth of traditional cable systems, further improvements in channel bandwidth are required to support increasing numbers of channels, high definition broadcast, and to comply with various regulations, such as digital must-carry rules that require cable systems to transmit certain programming regardless of their popularity or usage by the community.

SUMMARY OF THE INVENTION

In a principal aspect, the present invention provides increased channel utilization in HFC networks capable of uni-cast, multi-cast and/or broadcast of information. In accordance with the principles of the present invention, transmission of information, such as video programs, is performed by dynamically assigning the requested programming to a channel upon user request. This allows popular channels that are viewed by large numbers of users to be continuously transmitted. Other channels that are viewed less frequently can then be transmitted only upon user demand. Advantageously, such techniques allow availability of a greater number of programs than in traditional networks.

The principles of the present invention are particularly advantageous in transmission systems providing on-demand programming such as video programs. Transmission of certain programs that are viewed relatively infrequently only upon demand frees up network resources to allow availability of a far greater number of channels.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

The following description describes preferred embodiments which operate in the context of a cable television transmission system. While the principles of the present invention are particularly useful in such a system, such principles may be applied to other transmission networks. Moreover, such principles need not be limited to wired networks. Wireless transmission schemes may also benefit because of the limited bandwidth allocated by the Federal Communications Commission for various wireless transmission applications.

Traditional cable networks provide programming via a plurality of channels, regardless of the usage of the channels. Individual channels may have extremely low usage by the cable customers, but are provided as part of a package of the services by the cable operator to encourage customers to subscribe to the service. In addition, cable operators are subject to must-carry regulations that specify that some service must be carried regardless of their popularity or usage by the community.

Individual cable channels are typically characterized by very distinct usage pattern. There are a few high usage channels that always attract a large number of customers while the remaining channels accrue less and less usage according to their popularity. For example, at a particular point in time, the ownership of a set of channels may be described by a pattern where 90% of the customers use 10% of the channels. Of the remaining 10% of the customers, 90% of the customers use 10% of the remaining channels, etc. Such viewing patterns would lead, in a broadcast spectrum of 200 channels, to 40 channels being viewed by 99% of the users, while the remaining 160 channels will attract only 1% of the viewership. If in a particular cable network, the node size is a 1000 homes passed, of which 60% take cable service, and there are three sets/homes of which 50% are simultaneously in use, the 1% of the viewers require only 9 concurrent channels to access the remaining 160 channels. As can be seen, the traditional viewership distribution of available programming on a cable network leads to a great deal of wasted bandwidth when the transmitted channels are not actually viewed. This wasted bandwidth can be expected to increase as a number of available channels continues to grow.

Advantageously, embodiments employing the principles of the present invention allocate channels within the broadcast spectrum to video-programming having high viewership characteristics. The remaining video-programming is then allocated to the remaining channels and is transmitted only upon demand by customers. Therefore, while the video-programming in the remaining channels is available it is not actually transmitted, and therefore does not actually utilize network bandwidth unless it is specifically requested by a customer. Once a certain program that is not presently being transmitted is requested by a customer, that program then becomes available for that customer and subsequent customers who may wish to view it. When no customers are viewing the transmitted program, then it is no longer transmitted.

Figure 1:
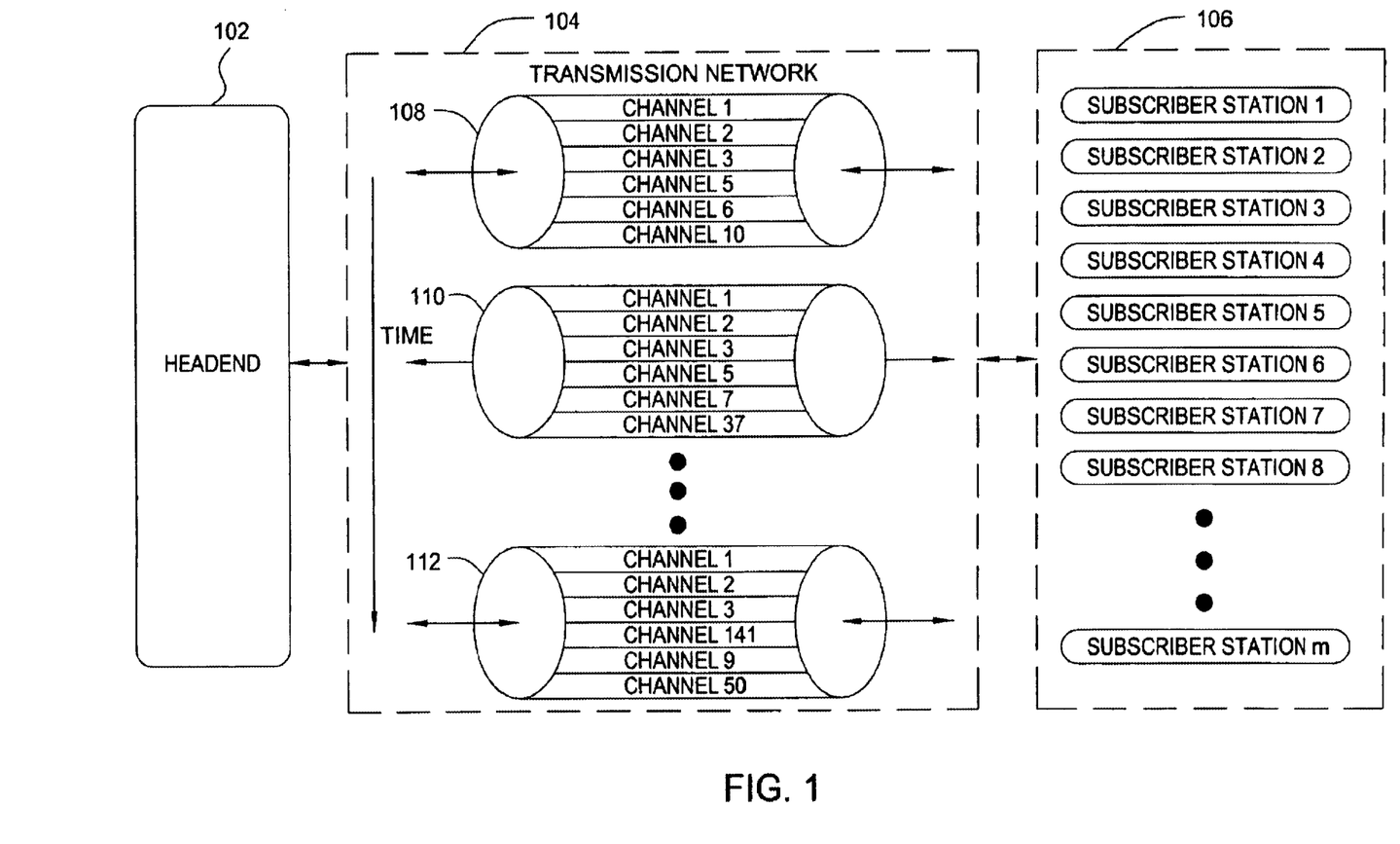
FIG. 1 is a high-level block diagram illustrating a system employing the principles of the present invention.

The foregoing functionality is illustrated in FIG. 1 in which a headend 102 transmits video-programming via a transmission network 104 to a plurality of subscriber stations 106. The transmission network 104 is characterized by a broadcast spectrum over which programs are transmitted to subscriber stations 106. The broadcast spectrum preferably comprises a semi-static broadcast portion of n channels, a on-demand broadcast portion of m channels, and an narrow-cast portion of p channels. Each of the three portions of the broadcast operation comprise a plurality of channel slots, which are allocated by headend 102 to particular programming. Preferably, headend 102 has the capability to change allocation of particular channels to channel slots. As used herein, the term channel slot is defined to mean a particular allocation within an available transmission spectrum to be used for transmission of a set of information, such as a television program. The exact manner in which the available transmission spectrum is divided into channel slots, such as by frequency multiplexing, time multiplexing, or a combination of such techniques is not critical, and can take any number of forms.

The transmission network 104 may take one of a variety of types of wireless or wired networks. In a preferred embodiment, the transmission network 104 takes the form of a Hybrid-Fiber Coaxial (HFC) system. HFC systems are increasingly being used and installed by cable operators to support the increasing bandwidth required of modern day and future cable systems. HFC systems take the form of a broadband bi-directional shared media transmission system using fiber trunks between the headend and fiber nodes, and coaxial distribution from the fiber nodes to the subscriber stations 106. Preferably, the headend 102 generates digitally encoded signals for the transmission network 104 for receipt by subscriber stations 106. Alternatively, the headend 102 can transmit signals in analog form for transmission by transmission network 104 and receipt by subscriber stations 106. However, while analog channels can be switched to implement the functions described herein, the technology is not as cost-effective as a digital implementation, and it is therefore preferable to employ digital transmission of information.

The subscriber stations 106 can take a variety of forms, such as, for example, a set-top box coupled to a television screen. A typical subscriber station takes the form of a digital computer with the programs necessary to implement the desired functions and supporting hardware necessary to receive and transmit (and encrypt/de-crypt) the required signals to and from the transmission network 104, a television screen and user operated input devices. The subscriber station 106 must be capable of receiving the signals 104 in whatever form they are transmitted, (analog or digital) and must be capable of tuning to such signals. Moreover, the subscriber stations 106 must be capable of transmitting signals by way of transmission network 104 to headend 102 that indicate the program(s) desired by a user of the subscriber station 106. Communication of information from the subscriber station 106 to the headend 102 can be performed by way of conventional techniques.

FIG. 1 shows transmission network 104 at three different points in time. As shown in FIG. 1, at time point 108 channels 1, 2, and 3, which are characterized by high viewership statistics, are transmitted by headend 102 for viewing by subscriber stations 106. In addition, channels 5, 6, and 10 are also being transmitted at time point 108 by headend 102. Channels 5, 6, and 10 are characterized by a viewership statistic that is lower than that for channels 1, 2, or 3. In other words, channels 5, 6, and 10 are viewed by a far fewer number of viewers than are channels 1, 2 or 3. Consequently, channels 5, 6, and 10 are dynamically allocated "on-demand channels or narrow cast channels." In other words, channels 5, 6, and 10 are transmitted only upon request by a subscriber station 106. In other terms, the high viewership channels are preferably transmitted over broadcast channels, and the lower viewership channels are preferably transmitted over narrow cast channels, as will be described in more detail below with reference to FIG. 2. The head end 102 is able to dynamically program or change which channels are transmitted on the broadcast and narrowcast channels.

At a subsequent point in time, time point 110, channels 1, 2, and 3 are still being transmitted. The on-demand channels being transmitted, however, have changed. Channel 5 continues to be transmitted because either, the originally requesting station 106 or a different station 106 has requested channel 5. However, channels 6 and 10, which were being transmitted at time point 108 are no longer being transmitted because viewing of programming on channels 6 and 10 has ceased. However, at least one subscriber station 106 has requested transmission of channel 7 and the same or another subscriber station has requested transmission of channel 37. Therefore, the on-demand channels at time point 110 are channels 5, 7, and 37.

At yet another a subsequent point in time, time point 112, channels 1, 2 and 3 continue to be transmitted while the on-demand channels have changed to channels 141, 9 and 50. As seen, the same three channel slots are used at different points in time to transmit different sets of programming.

The foregoing explanation of the variation over time of on-demand channels being transmitted over transmission network 104 is a highly simplified example of the manner in which on-demand channels may be dynamically changed in accordance with user requests. In an actual network, the number of broadcast channels, such as channels 1, 2 and 3, and the number of on-demand channels would be far greater, perhaps exceeding several hundred channels available over a fraction of the number of channel slots within a broadcast spectrum in transmission network 104. Moreover, the allocation of channels or types of channels to channel slots need not be fixed. For example, channels 1, 2 and 3 do not need to remain allocated to the channel slots shown in FIG. 1. Channels 1, 2 and/or 3 can be allocated to different channel slots over time. At a certain point in time, there may be fifty channel slots allocated for high-viewership channels, and 150 channel slots allocated as on-demand channel slots to lower viewership channels. At a different point in time, forty channel slots may be allocated for light-viewership channels, while the remaining 160 channel slots are allocated as on-demand channels to lower viewership channels.

Figure 2:
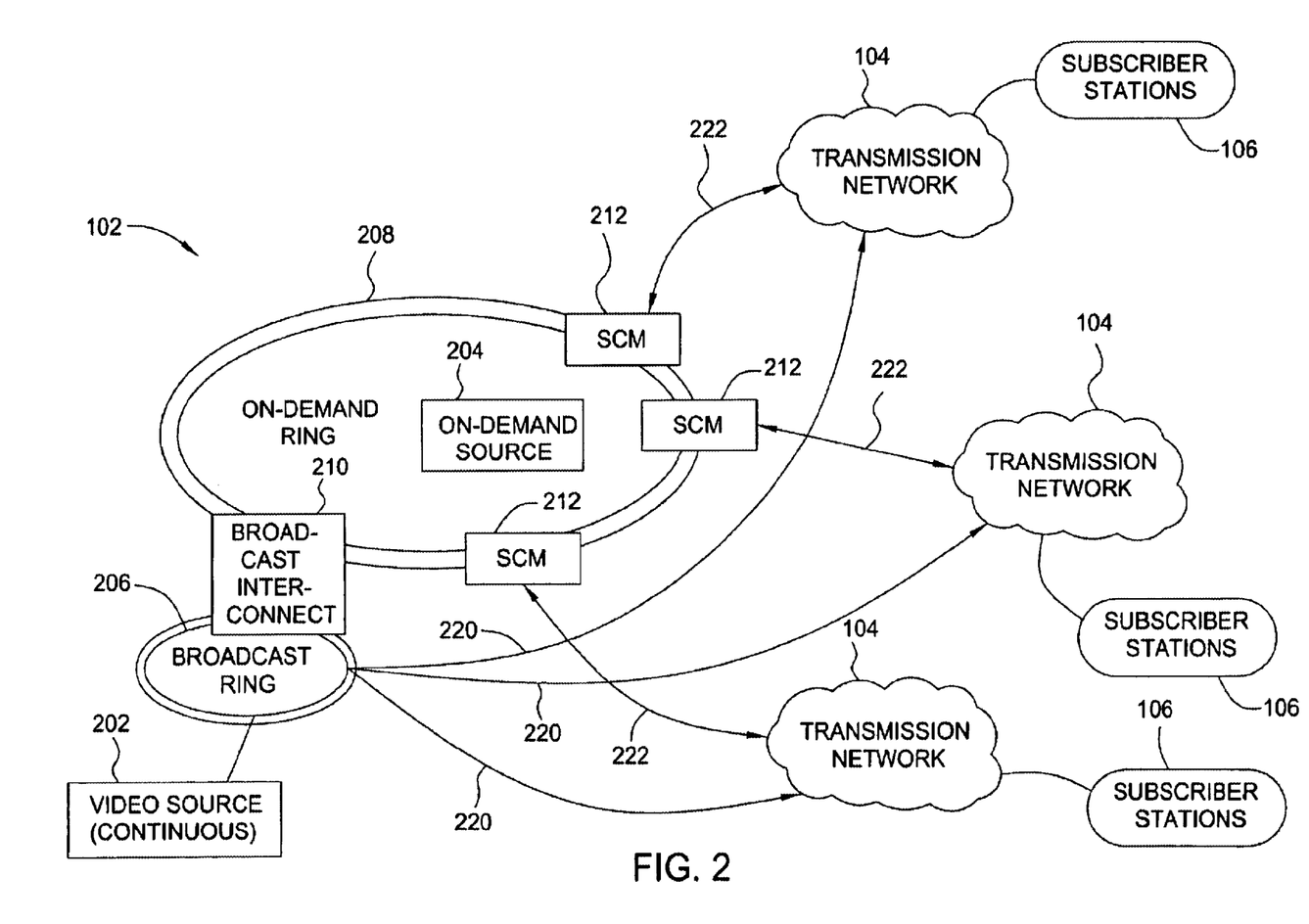
FIG. 2 is a high-level block diagram illustrating further details of the headend and transmission network of FIG. 1.

FIG. 2 shows the headend 102 and transmission network 104 in greater detail. Programming, such as video-programming and content, is provided by a continuous source 202 and also by an on-demand source 204. Continuous source 202 provides a substantially continuous stream of video-programming. On-demand source 204, in contrast, provides video-programming only upon request from subscriber stations 106 via a respective session control manager (SCM) 212 for particular programming. Video-programming originating from continuous source 202 is provided to transmission network 104 by way of a broadcast ring 206 and broadcast channels 220. The broadcast ring 206 preferably operates using an adaptation to the Asynchronous Serial Interface (ASI) standard as will be described below with reference to FIGS. 3 and 4. Some channels, preferably the lower usage channels, are also provided from the broadcast ring 206 to the on-demand ring 208 by the broadcast inter-connect 210. Video programming originating from on-demand source 204 is also provided on the on-demand ring 208, and thereby to transmission networks 104. Typically, the broadcast ring 206 contains a first number of channels, a subset of which are provided by broadcast inter-connect 210 to on-demand ring 208.

Each Session Control Manager (SCM) 212 is coupled by a narrow cast channel 222 to a corresponding transmission network 104 with its corresponding subscriber stations 106. The SCM's 212 respond to requests from corresponding subscriber stations 106 for on-demand programs by causing the requested program(s) to be introduced onto the on-demand ring 208 by on-demand source 204. The SCM's 212 also update the subscriber stations 106 with information indicating broadcast channel availability. The SCM's 212 also collect information form each of the corresponding subscriber stations 106 regarding the frequency of channel usage and favorite channel selections. This information is made available to broadcast interconnect 210, which uses this information to manage the broadcast channels 220, and the narrowcast channels 222 of the broadcast spectrum. An exemplary embodiment for such an SCM 212 is shown and described in U.S. Pat. No. 6,253,375, issued Jun. 26, 2001, and entitled "System for Interactively Distributing Information Services" which is incorporated herein by reference.

On-demand source 204 is coupled to each of the SCMs 212 and takes the form of a programmed computer with associated storage to provide video programming in response to requests from SCMs 212. Such an exemplary on-demand source 204 is described in U.S. Pat. No. 6,253,375, issued Jun. 26, 2001 and U.S. patent application Ser. No. 09/197,340, filed Nov. 20, 1998, and entitled "System and Method For Detecting and Correcting A Defective Transmission Channel in an Interactive Information Distribution System" the disclosures of which are both incorporated herein by reference.

Broadcast interconnect 210 connects broadcast ring 206 to on-demand ring 208 and operate to allow a subset of the channels on broadcast ring 206 to be introduced to the on-demand ring 208. The broadcast interconnect 210 includes ring terminal functionality as is described below with reference to FIGS. 4–6 to couple with both the broadcast ring 206 and the on-demand ring 208. The broadcast interconnect 210 is responsive to a broadcast control element (not shown) that indicates the channels from the overall set of broadcast channels which are to be selected and sent to the on-demand ring 208. The selection of channels is according to pre-provisioning, a manually entered schedule, or a demand schedule from broadcast control element based on customer demand. While the present invention has been described above with reference to FIG. 2 in the context of a plurality of rings 206, 208 which is the preferred embodiment, those skilled in the art will recognize that the present invention applies equally for use in various other network topologies.

Figure 3:
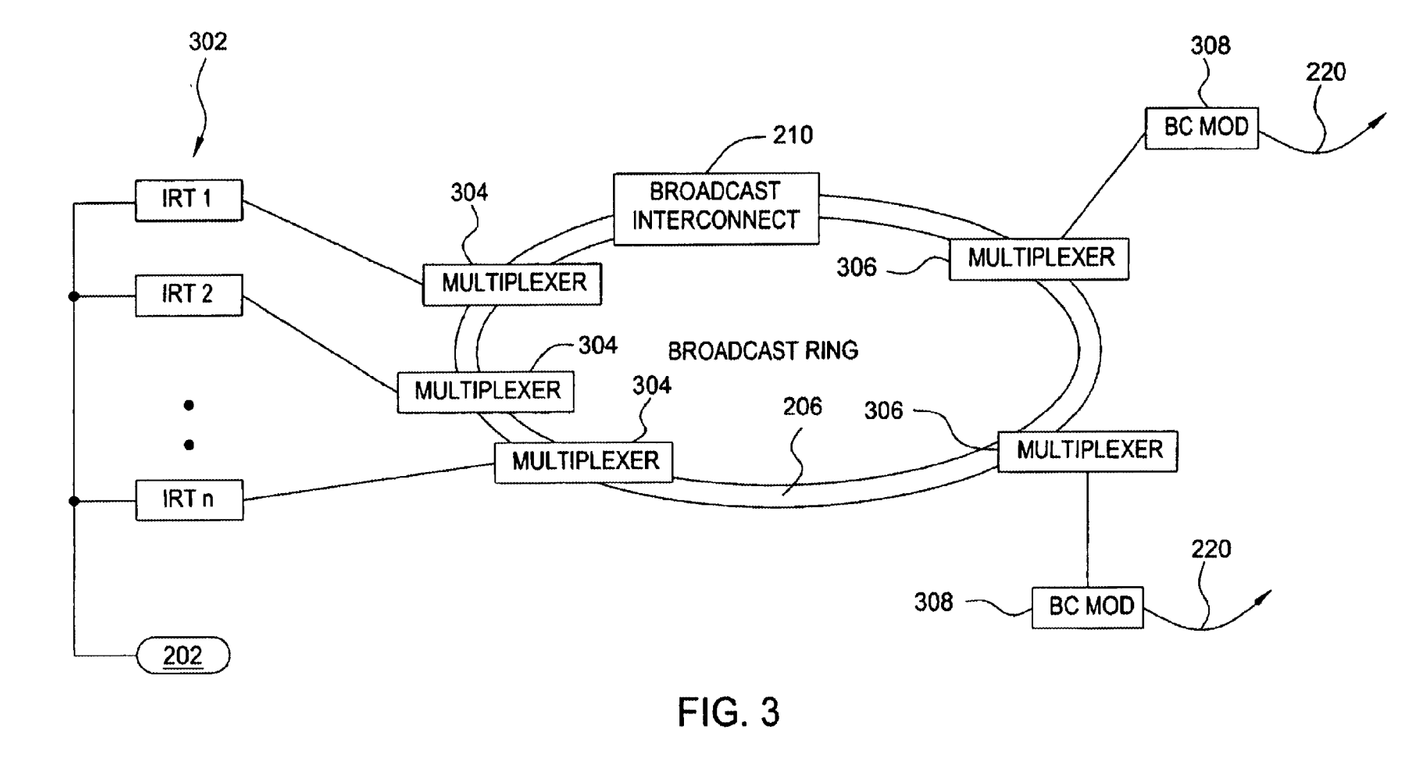
FIG. 3 is a block diagram illustrating further details of the broadcast ring of FIG. 2.
Figure 4:
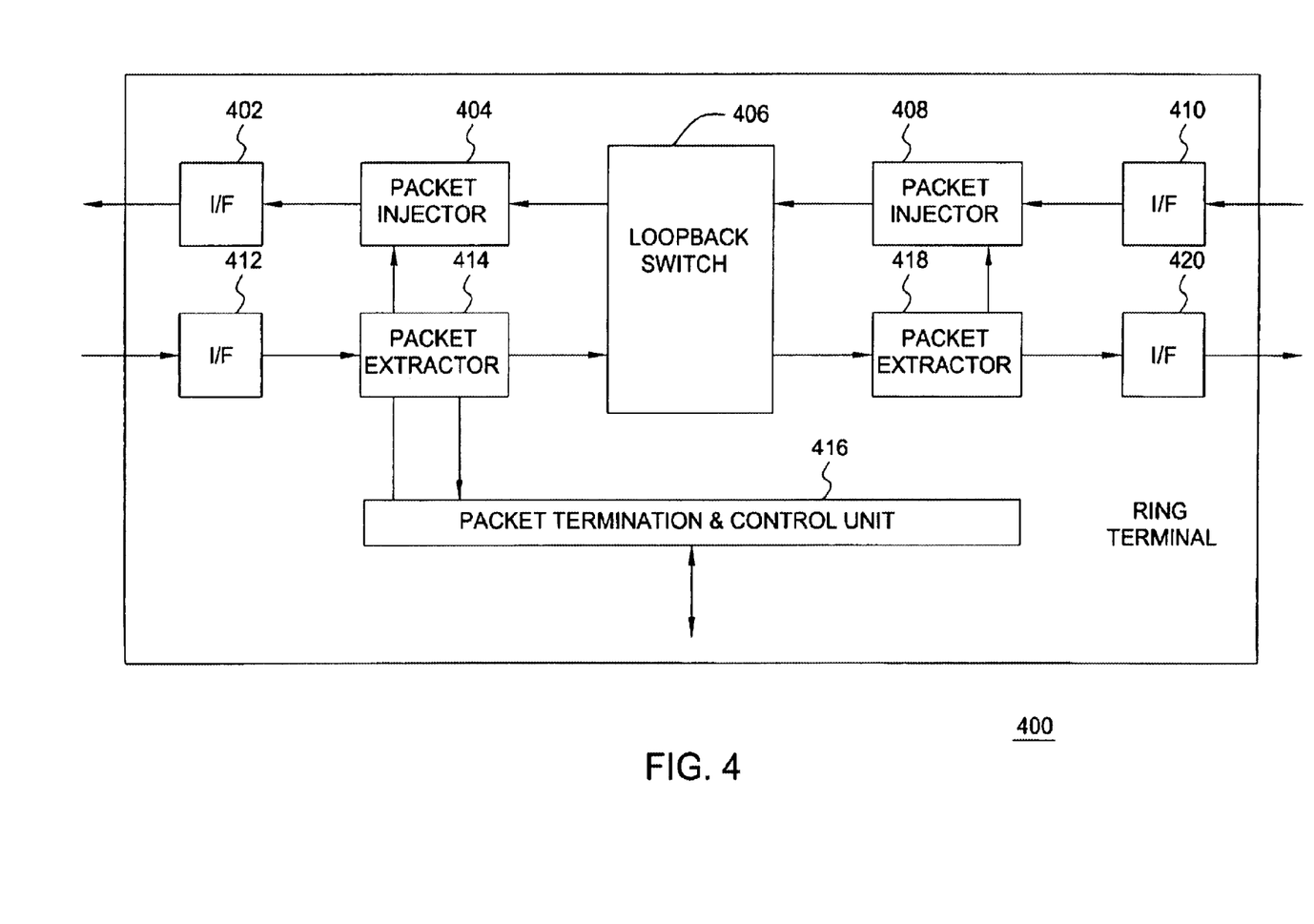
FIG. 4 is a block diagram of a preferred embodiment of the ring terminal constructed according to the present invention.
Figure 5:
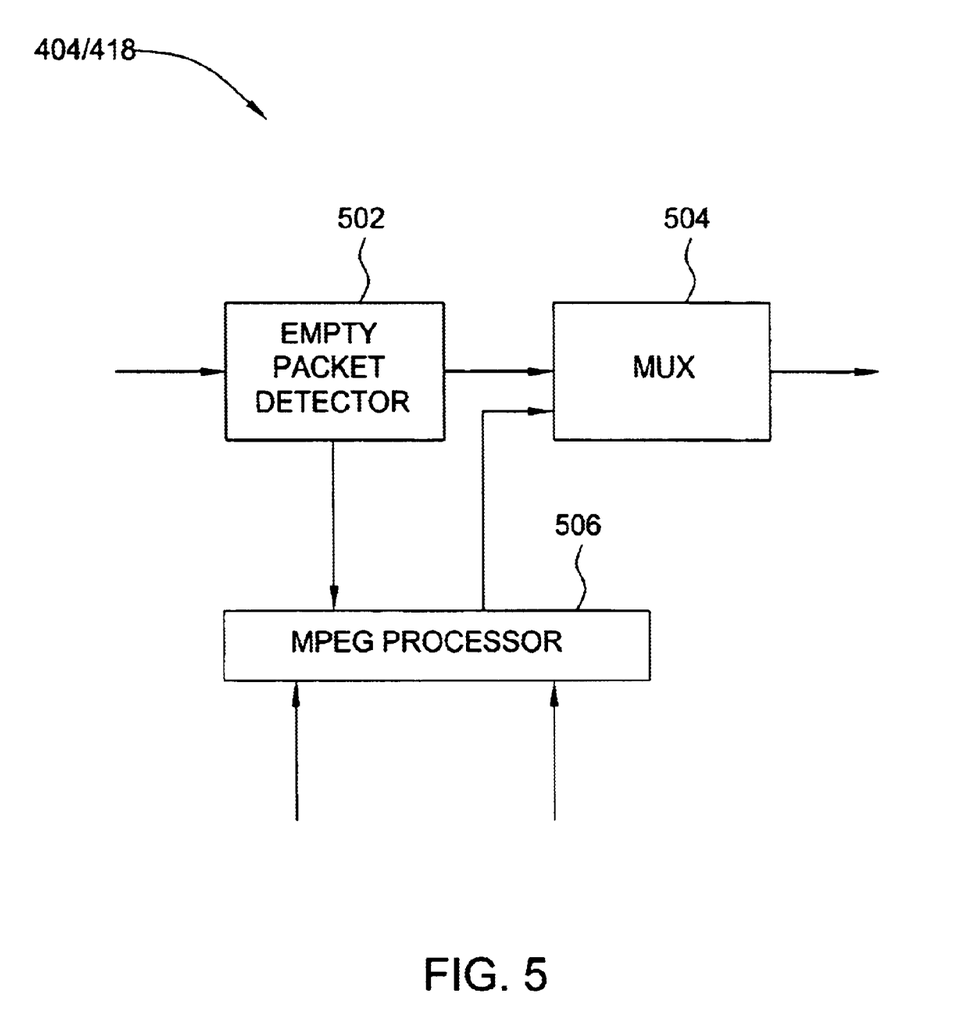
FIG. 5 is a block diagram of a preferred embodiment of a packet injector of the present invention.
Figure 6:
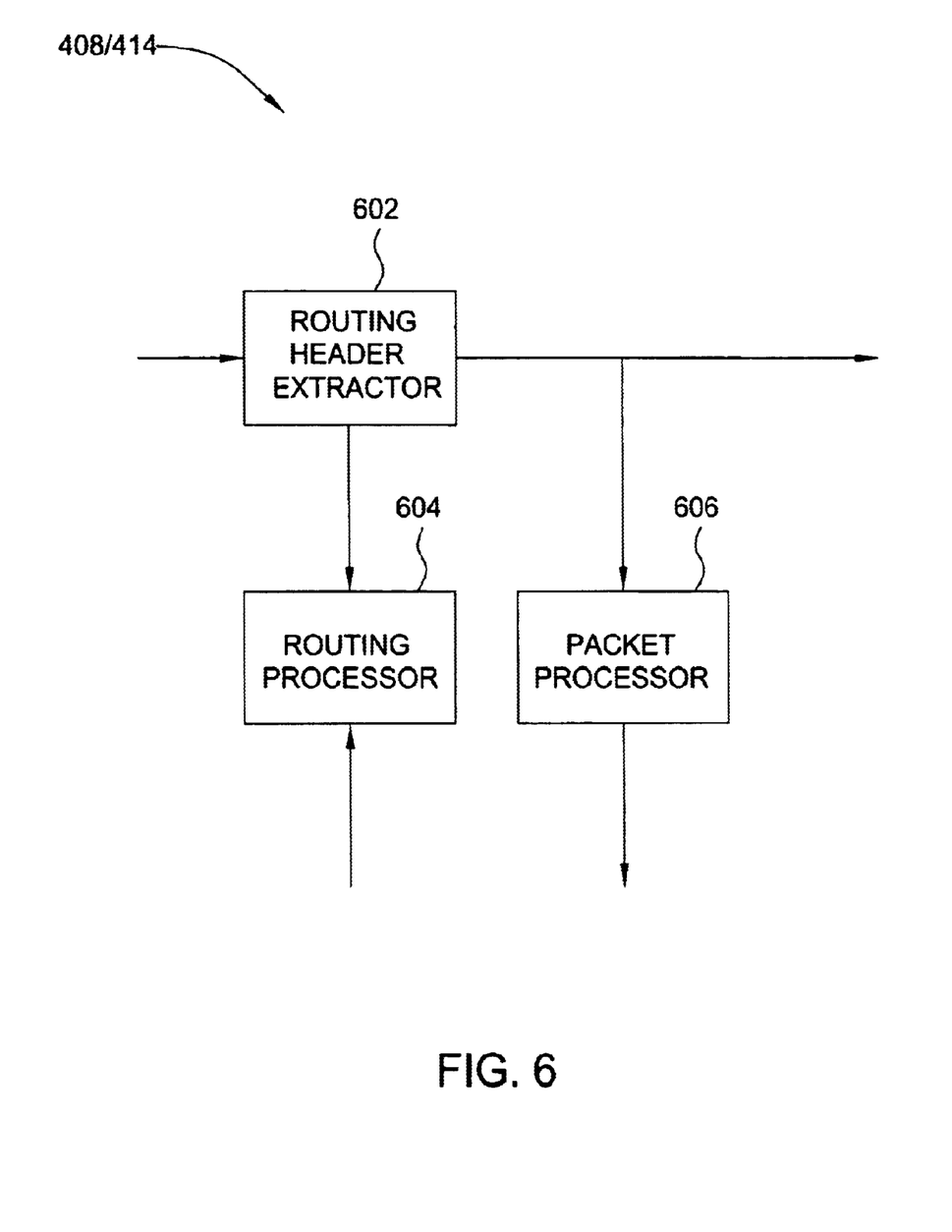
FIG. 6 is a block diagram of a preferred embodiment of a packet extractor of the present invention.

FIG. 3 shows broadcast ring 206 and video source 202 in further detail. Digital broadcast receivers (IRTs) 302 receive and decrypt digital signals provided by one or more video sources 202. Alternatively, real-time MPEG encoders may be used to create a digital signal from analog sources. The output of the IRT receivers 302, which typically contain multiple channels using MPEG-2 System Information (SI) are inserted onto the broadcast ring 206 by ring insertion multiplexers including a ring terminal 304. An exemplary embodiment for such multiplexers 304 are shown in FIGS. 4–6 and will be described below. These multiplexers 304 preferably perform MPEG-2 re-multiplexing to create a ring multiplex containing a first number of channels (for example, 200 channels) of programming. The broadcast ring 206 takes the form of a bidirectional. ring, where each ring supports half the broadcast program traffic. The ring 206 may be implemented using optical fiber or electrical interconnections. The ring 206 has a plurality of nodes 304, 306 and 210 which may either insert information onto the ring media 206 or extract information from the ring media 206. Each node 304, 306 and 210 has responsibility for detecting breaks in the ring 206 and repairing the breaks. The ring approach of the present invention implements a combination of path switched and line switched ring functionality as originally described in the Bellcore SONET ring patents. The principal differences are: the use of MPEG packets as the transport container; the user of MPEG SI for ring traffic identification; the use of ASI 8B/10B encoding for the physical layer; and the use of an ASI comma code to indicate vacant cells on the ring and communicate ring breaks. On detection of a break, the traffic flows are redirected according to a priority scheme dictated by the broadcast control element 308 to assure the maximum level of available service. Once introduced on the ring 206, the combined MPEG-2 information stream is available to both the broadcast multiplexers 306 and the broadcast ring interconnect 210. The channels to be broadcast are selected from the overall set of channels by a broadcast control element (not shown) according to pre-provisioning, a schedule entered by the operator, or a demand schedule calculated by the broadcast control element according to customer demands. In practice, some multiplexers are dedicated (pre-provisioned) with a fixed set of extremely popular channels while others are scheduled or provisioned on-demand.

The broadcast multiplexers 306 extract channels from the broadcast ring 206 and prepare them for transmission over the HFC network using broadcast modulators 308 to provide the broadcast channels over line 220. The broadcast multiplexers 306 and BC modulators 308 then recreate the individual channel multiplex using existing MPEG re-multiplexing technology, encrypt the channels according to the conditional access scheme and convert the channel to analog form using QAM or equivalent modulation, as will be understood by those skilled in the art. These channels are then combined with the analog channels broadcast using traditional techniques. Alternatively, these channels can be transmitted in digital form to a remote location prior to modulation.

Referring now to FIGS. 4–6, the rings 206, 208 and the components attached to and forming the rings 206, 208 will be described in more detail. Specifically, the rings 206, 208 are preferably based on the international Asynchronous Serial Interface (ASI) standard for MPEG 2 transport that provides for up to 216 Mbps of MPEG 2 payload using and 8B/10B encoding on a point to point asynchronous serial interface. The present invention advantageously extends this interface to terminal interconnects at 1 Gbps or higher using the fiber channel and error protection information to allow the implementation of MPEG packet cross connects. As noted above, the preferred implementation uses ASI comma codes to signal unused ring bandwidth and link failures.

The rings 206, 208 are switched rings to provide fault tolerance and for simplicity of implementation. For example, the rings 206, 208 can be implemented using a scheme similar to SONET path switched rings structure known to those skilled in the art. This ring structure preferably uses a MPEG packet based payload. The MPEG transport packet is preferably extended to optimize routing and switching considerations. In particular, the transport packet is modified as shown in Table 1. The standard MPEG 2 transport packet is

TABLE 1

| | | | | | | |
|---|---|---|---|---|---|---|
| MPEG2 Transport Packet | | | HDR | Adaptation | Payload | |
| Ring Transport Packet | SOP | Routing | HDR | Adaptation | Payload | CRC | extended with a start of packet character (SOP), a routing header, and a cyclic redundancy check field. The SOP character is chosen from the ASI comma codes to ensure accurate detection of packets in the link. The routing header provides for a number of different routing possibilities including point to point and point to multi-point routing. A sixteen bit CRC is used for error detection on the rings 206, 208.

Ring terminals 400 are used to perform a number of functions including: 1) head of ring slot generation; 2) packet injection; 3) packet extraction; and 4) link failure detection and ring switching. The ring terminals 400 are included as part of or coupled to the SCM 212, the broadcast interconnect 210, the multiplexer 304, and the node 306. While ring terminals 400 can perform these general functions, the present invention provides specific ring terminals 400 developed to implement specific network functions such as 1) source multiplexer (e.g., multiplexer 304); 2) terminal multiplexer (e.g., BC modulator 308); and 3) ring cross connect (e.g., broadcast interconnect 210). The ring terminals 400 of the present invention are interconnected with this modified ASI interface to implement switching structures and networks that are optimized for the transport and interconnect of digital video programming that is MPEG encoded. While the ring terminals 400 are described above with specific functions for extracting or injecting data from/to the rings those skilled the art will recognize that the ring terminal function may be combined with other functions. For example, to simplify networking, a remote terminal multiplexer may include the capability of routing IP packets to and from local control equipment. Thus, while the main function of the ring element is that of terminal multiplexer it will also contain an auxiliary functions of IP cross connect and source.

Referring now to FIG. 4, a preferred embodiment for the ring terminal portion 400 of the above elements is shown. The ring terminal 400 preferably comprises a plurality of physical interfaces 402, 412, 410, 420, a plurality of packet injectors 404, 418, a plurality of packet extractors 408, 414, a switch 406, and packet termination and control unit 416.

The plurality of physical interfaces 402, 412, 410, 420 convert the external interface (ASI), be they optical or electrical into the internal representation. The receive side of these interfaces 412, 410 also perform clock extraction and the detection of link failures by the presence of illegal characters on the link. Those skilled in the art will recognize that the physical interfaces 402, 412, 410, 420 may be any one of a number of conventional physical interfaces.

Referring also now to FIG. 5, the plurality of packet injectors 404, 418 are shown in more detail. Each packet injectors 404, 418 comprises an empty packet detector 502, a MPEG processor 506 for re-multiplexing, and a packet multiplexer 504. The empty packet detector 502 identifies locations in the bit stream where packets may be injected by looking for the empty packet information in the routing header. Empty packet slots are identified to the MPEG processor 506, which checks the packet terminal dispatch queue for packets to be sent on the ring 206, 208. If a packet is identified then the MPEG processor 506 performs the MPEG packet time re-timing function then inserts the packet in the ring 206, 208.

Referring also now to FIG. 6, the plurality of packet extractors 408, 414 are shown in more detail. Each packet extractor 408, 414 comprises a routing header extractor 602, a routing processor 604, and a packet processor 606. The routing header extractor 602 parses each packet and copies the header information to the routing processor 604. The routing processor 604 uses information from the packet header to identify packets destined for this ring terminal 400. The implementation of the routing processor 604 uses two content addressable memories, one for point cast packets and one for broadcast packets. Packets destined for this ring terminal 400 are extracted from the stream by the packet processor 606, which then copies them to the packet termination and control unit 416.

Referring to FIG. 4, loopback switch 406 performs two functions, which are: 1) generation of the empty packets if this ring terminal 400 is designated as the head of bus; and 2) ring switching when the interface elements 402, 410, 412, and 420 detect a link failure.

The functions of the packet processor and control unit 416 are dependent on the particular type of ring terminal 400 that is implemented. However, as has been described above, the packet processor and control unit 416 will control the ring terminal 400 to extract data from the ring 206, 208, input data to the ring 206, 208, depending on whether the ring terminal is associated with the SCM 212, the broadcast interconnect 210, the multiplexer 304, and the node 306. The functions the packet processor and control unit 416 implements includes 1) stream rate adaptation and MPEG re-timing for a received packet stream, 2) terminal control and processing which will include setting the routing processor information, as well as exchanging information with other ring terminals 400 to determine the head-of-ring location, and 3) alarm processing and reporting. For example, the broadcast interconnect 210 includes a pair of terminals for each respective ring 206, 208 and performs the function of extracting particular broadcast channels from the broadcast ring 206 and inserting the same data on the on-demand ring 208.

On demand or switched broadcast channels are introduced to the on-demand ring 208 where they become available to session control managers 212. The session control managers 212 manage and groom on-demand multimedia traffic to the individual HFC nodes. It is the responsibility of the SCM 212 to keep subscriber stations 106 up to date with the state of broadcast channel availability.

Figure 7:
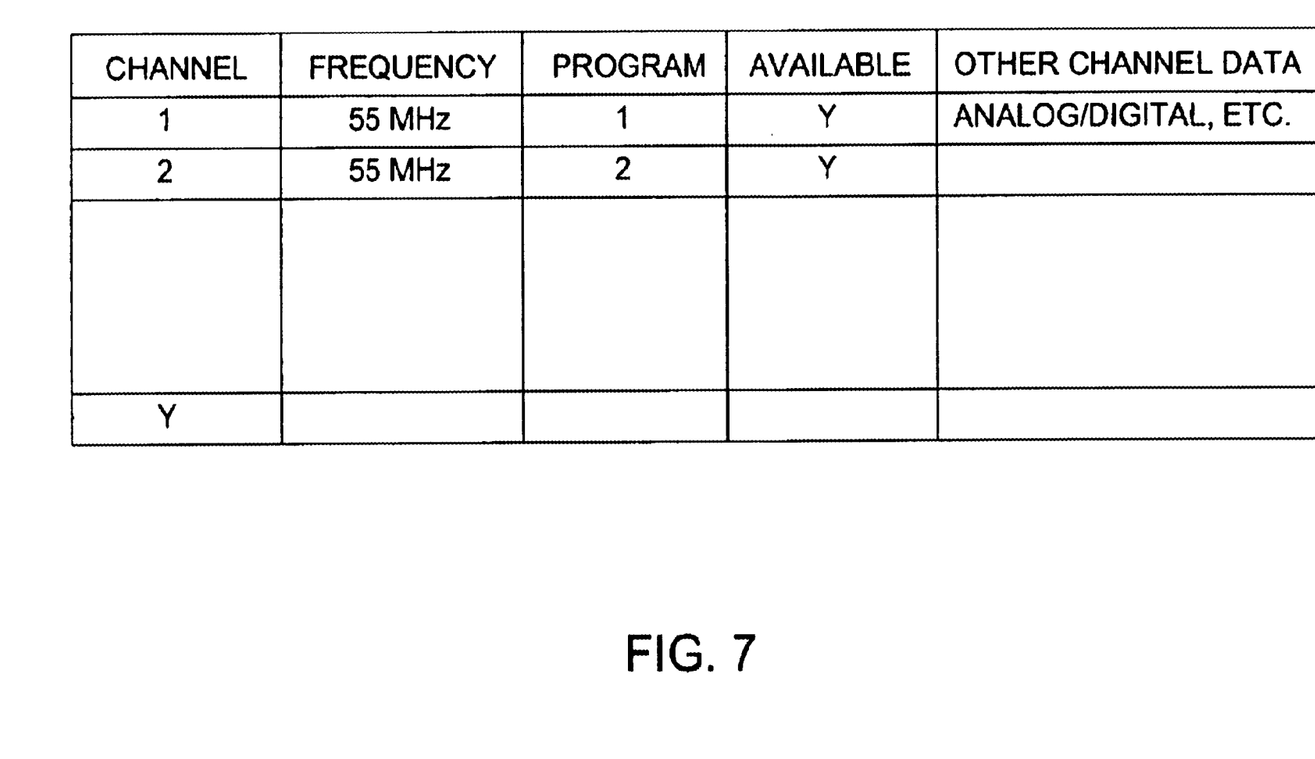
FIG. 7 illustrates a channel map of a preferred embodiment.

The state of broadcast channel availability takes the form of a channel map, shown in FIG. 7, which comprises a table where each row of the table is divided into a plurality of columns for indications of frequency, program availability, and other channel data for each channel. For example, as shown in FIG. 7, the channel map contains, for each channel, a corresponding column for frequency of that channel, the program's identity for that channel, availability of the channel and other channel data, for instance, if the channel is analog or digital. When a channel is not currently broadcast, the available column in the channel map will indicate that the channels are currently available only on demand.

Subscriber station 106 autonomously selects a channel that is part of the broadcast spectrum, assuming the customer currently subscribes to that channel. The subscriber station 106 preferably displays appropriate messages when a customer is not currently subscribed.

Figure 8:
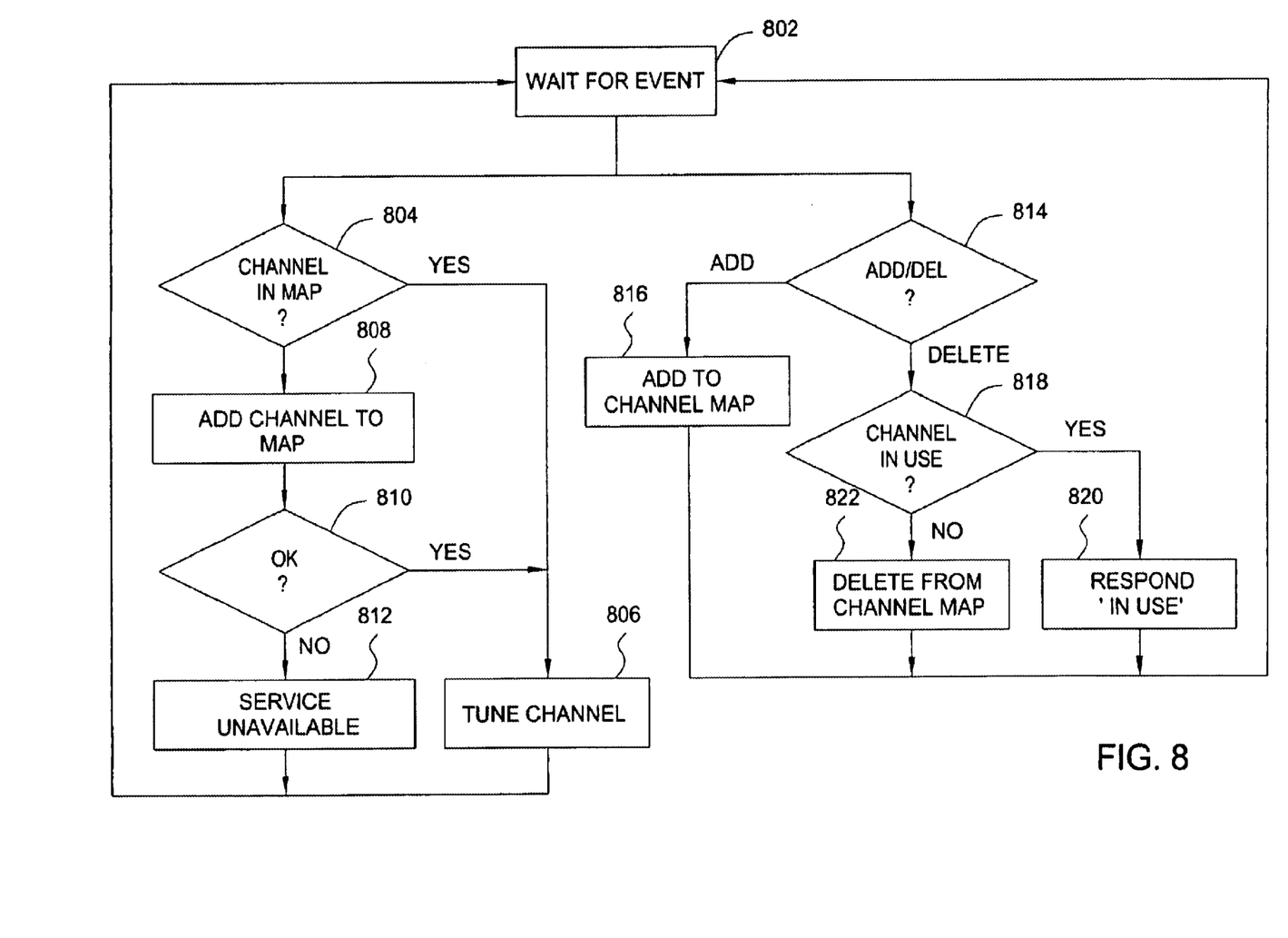
FIG. 8 is a flow chart illustrating operation of a preferred embodiment of a subscriber station.

FIG. 8 shows in flow chart form the channel tuning process in the subscriber station 106. The subscriber station 106 responds at step 802 to one of two events. When the user tunes to a channel, then the subscriber station 106 executes the series of steps starting at step 804 where it determines whether the requested channel is in its channel map. If so, then the subscriber station 106 tunes to the channel at step 806 since the channel is already being send over transmission network 104 and the process returns to step 802. If the requested channel is not in the channel map, then at step 808 the subscriber station 106 attempts to add the channel to the channel map by requesting the channel from the SCM 212. The subscriber station 106 then performs a test at step 810 to determine if the channel was successfully added to the channel map. If so, then the subscriber station 106 proceeds to step 806 to tune in the channel as has been described above. If the requested channel could not be added to the channel map, then at step 812, the subscriber station 106 informs the user that the requested channel is unavailable and then returns to step 802.

The subscriber station 106 can also respond to an event from the headend 102 to add or delete channels from the channel map. If the add/delete request from the headend 102 is an add request as determined at step 814, then at step 816 the new channel or channels are added to the channel map and the subscriber station 106 returns to step 802. If the add/delete request is a delete request, then at step 818 the subscriber station 106 determines if the channel is currently being used by the user. If so, then the subscriber station 106 transmits in step 820 a message to the headend 102 that the channel requested to be deleted is "in use" and then returns to step 802. If the channel requested to be deleted is not being used then at step 822 the channel is deleted from the channel map.

When the corresponding SCM 212 receives the request generated at step 808, it allocates a modulator and provides frequency and program information to the subscriber station 106, if possible, for channels that exist on the on-demand ring 208. Otherwise, the SCM 212 coordinates with the broadcast control element, establishes the channel, and then provides frequency and program number information.

Figure 9:
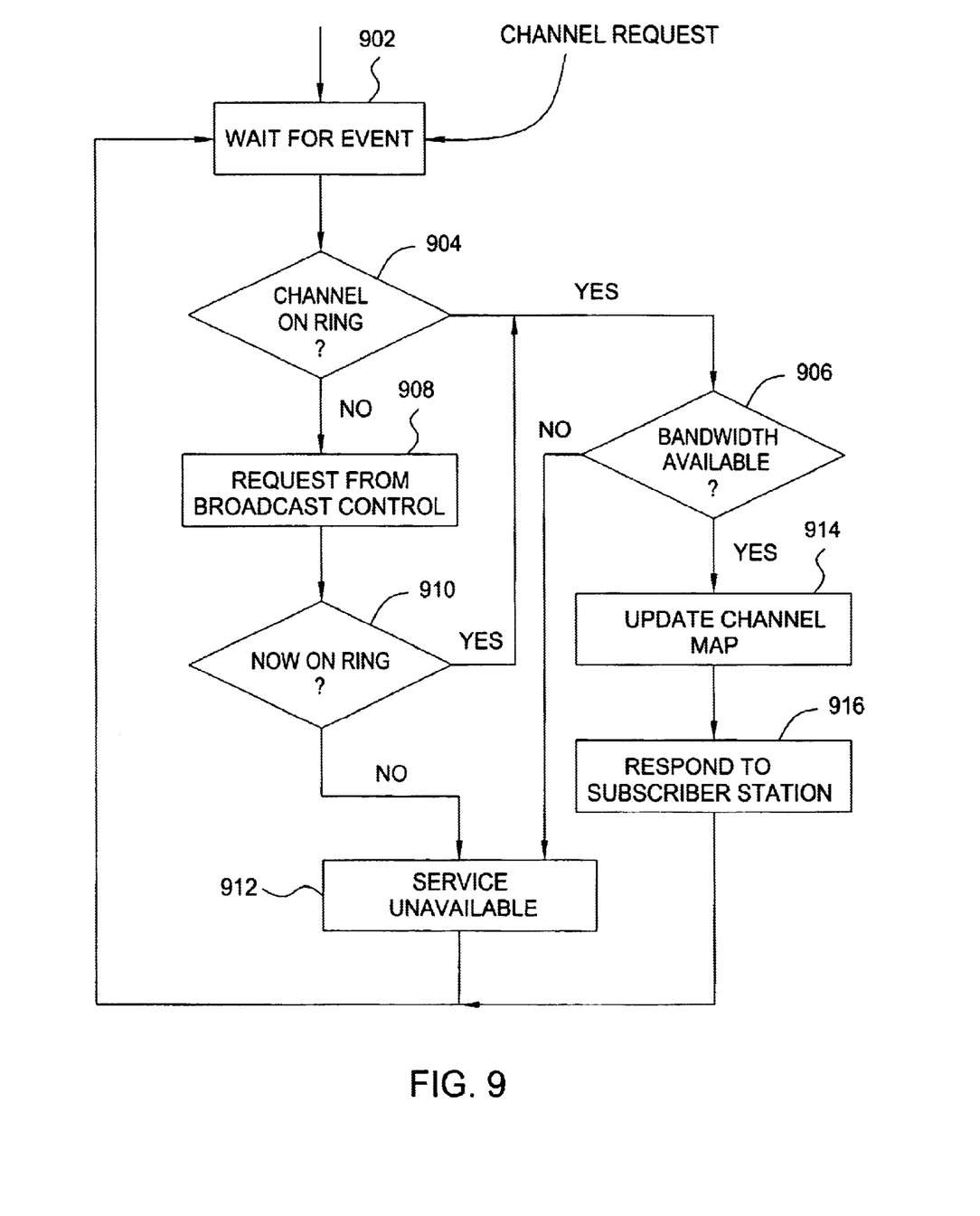
FIG. 9 is a flow chart illustrating operation of a preferred embodiment of a session control manager.

FIG. 9 shows a flow chart of the typical processing performed by the SCM 212 in processing the channel map and unicast requests generated at steps 808 and 816. The SCM 212 responds to a channel request at 902 by determining, at step 904, if the requested channel is on the on-demand ring 208. If so, then the SCM 212 determines if there is sufficient bandwidth available on the transmission network 104 at step 906. If so, then the SCM 212 updates its own channel map in step 914, and responds to the subscriber station's request in step 916, by providing the frequency and program information to the subscriber station 106.

On the other hand, if at step 904 the requested channel is determined to not be on the on-demand ring 208, then the SCM 212 requests the channel from the broadcast ring 206, at step 908. In response to such a request, the broadcast control element will instruct and control the broadcast interconnect 210 to transfer the requested channel from the broadcast ring 206 to the on-demand ring 208. At step 910, the SCM 212 performs a check similar to that performed at step 904 to determine if the requested channel is on the on-demand ring 208. If so, then the SCM 212 performs steps 904, 908 and 910 as described above. If the requested channel has not been placed on the on-demand ring 208 from the broadcast ring 206 then the SCM 212 determines that the service is unavailable and provides this information at step 912 to the subscriber station 106. The SCM 212 includes remultiplexing capability such that a narrow-cast spectrum can be created on the on-demand ring 208 from the entire spectrum on the broadcast ring 206.

It is to be understood that the specific mechanisms and techniques which have been described are merely illustrative of one application of the principles of the invention. Numerous additional modifications may be made to the methods and apparatus described without departing from the true spirit of the invention.

What is claimed is:

1. A method of increasing channel utilization in a video broadcast system comprising:

dynamically assigning a first subset of broadcast channels in the broadcast spectrum to a first subset of video programming characterized by a first subscriber viewership level greater than a threshold level;

dynamically assigning a second subset of broadcast channels in the broadcast spectrum to a second subset of video programming, characterized by a second subscriber viewership level less than said threshold level;

dynamically assigning a third subset of channels to a third subset of video programming, characterized by a subscriber viewership based upon video-on-demand;

causing substantially continuous transmission of said first subset of video programming;

causing transmission of said second subset of video programming upon a request from a subscriber to said video broadcast system by determining availability of channels in said second subset of channels and assigning video programming corresponding to said request to an available one of said second subset of channels; and causing transmission of said third subset of video programming upon request of a subscriber to said video broadcast system by assigning video programming corresponding to said request to an available one of said third subset of channels.

2. A method as set forth in claim 1, further comprising:

responding to said request from said subscriber in the absence of availability of a channel in said second subset of channels by informing said subscriber of said absence of availability.

3. An on-demand video broadcast system that causes transmission over a broadcast medium of video programs in response to requests from subscriber stations for said video programs, the system including a transmission network for carrying and providing a plurality of channels of video programs, and providing a return pattern for control signals;

a plurality of subscriber stations coupled to the transmission network for receiving and decoding the plurality of channels of video programs, and for transmitting control signals on the return path; and a head end, for dynamically assigning a first subset of broadcast channels in the broadcast spectrum to a first subset of video programing representing a first subscriber viewership level greater than a threshold level; dynamically assigning a second subset of broadcast channels in the broadcast spectrum to a second subset of video programming representing a second subscriber viewership level less than said threshold level; dynamically assigning a third subset of channels to a third subset of video programming representing a subscriber viewership based upon vide-on-demand; causing substantially continuous transmission of said first subset of video programming over said transmission network from said head end to a plurality of subscriber stations; causing transmission of said second subset of video programming over said transmission network from said head end upon a request from a subscriber station to said video broadcast system by determining availability of channels in said second subset of channels and assigning video programming corresponding to said request to an available one of said second subset of channels; and causing transmission of said third subset of video programming over said transmission network from said head end upon request from at least one of said subscriber stations to said video broadcast system by assigning video programming corresponding to said request to an available one of said third subset of channels.

4. An on-demand system as set forth in claim 3 further comprising a plurality of session control managers, each session control manager responding to corresponding ones of said subscriber stations, said session control managers interconnected by a first transmission medium that provides video programs available to any one of said session control managers to the remaining ones of said session control managers.

5. An on-demand system as set forth in claim 4 wherein the session control managers further cause transmission of a plurality of broadcast programs substantially continuously to corresponding ones of said subscriber stations and wherein the first transmission medium receives broadcast programs from a second transmission medium.

6. An on-demand system as set forth in claim 5 wherein the second transmission medium takes the form of a ring that inter-connects a plurality of multiplexers, each of the multiplexers coupling the second transmission medium to said first transmission medium.

7. An on-demand system as set forth in claim 5 wherein each of said subscriber stations maintains a channel map containing information indicative of channels currently available on said first transmission medium, wherein said channel map is updated by a corresponding one of said session control managers.

8. An on-demand system as set forth in claim 7 wherein any one of said session control managers responds to a request by a subscriber station for a channel that is not currently available on said first transmission medium by requesting said channel from said second transmission medium.

9. An on-demand system as set forth in claim 8 wherein any one of said session control managers responds to a request by a subscriber station for a channel that is not currently available on said first transmission medium and not currently available on said second transmission medium by allocating another concurrent channel and requesting said channel from a third transmission medium.

10. An on-demand system as set forth in claim 8 wherein said session control manager responds to said requested channel being placed on said first transmission by causing update of said channel map of said requesting subscriber station.

11. An on-demand system as set forth in claim 7 wherein said update of said channel map by a corresponding one of said session control manager comprises deleting selected ones of said channels and wherein said corresponding one of said session control managers responds to a message from a corresponding one of said subscriber stations that a channel to be deleted from said channel map is currently being used by said subscriber station by foregoing deletion of said channel.

\* \* \* \* \*

UNITED STATES PATENT AND TRADEMARK OFFICE
CERTIFICATE OF CORRECTION

PATENT NO. : 6,718,552 B1　　　　　　　　　　　　　　　　　　　　　　　Page 1 of 1
DATED : April 6, 2004
INVENTOR(S) : Goode

It is certified that error appears in the above-identified patent and that said Letters Patent is hereby corrected as shown below:

Column 10,
Line 5, after "programming" insert a -- , --.
Line 4, after "including" insert -- : --;

Column 11,
Line 7, "pattern" should be -- path --;
Line 14, "programing" should be -- programming --;
Line 22, "vide-on-demand" should be -- video-on-demand --.

Signed and Sealed this

Twenty-fifth Day of May, 2004

JON W. DUDAS
*Acting Director of the United States Patent and Trademark Office*